(12) United States Patent
Kim et al.

(10) Patent No.: US 9,396,223 B2
(45) Date of Patent: Jul. 19, 2016

(54) METHOD FOR PERFORMING FULL-TEXT-BASED LOGIC OPERATION USING HASH

(71) Applicant: REALTIMETECH CO., LTD., Daejeon (KR)

(72) Inventors: Jae-Kwang Kim, Daejeon (KR); Hyeok Han, Daejeon (KR); Seong-il Jin, Daejeon (KR)

(73) Assignee: REALTIMETECH CO., LTD. (KR)

( * ) Notice: Subject to any disclaimer, the term of this patent is extended or adjusted under 35 U.S.C. 154(b) by 0 days.

(21) Appl. No.: 14/116,834

(22) PCT Filed: Oct. 23, 2012

(86) PCT No.: PCT/KR2012/008715
§ 371 (c)(1),
(2) Date: Nov. 11, 2013

(87) PCT Pub. No.: WO2014/003249
PCT Pub. Date: Jan. 3, 2014

(65) Prior Publication Data
US 2015/0213016 A1  Jul. 30, 2015

(30) Foreign Application Priority Data
Oct. 17, 2012  (KR) .......................... 10-2012-0115454

(51) Int. Cl.
*G06F 17/30* (2006.01)
*G06F 7/00* (2006.01)

(52) U.S. Cl.
CPC ...... *G06F 17/3033* (2013.01); *G06F 17/30628* (2013.01)

(58) Field of Classification Search
CPC .................. G06F 17/3033; G06F 17/30628
USPC ......................................................... 707/747
See application file for complete search history.

(56) References Cited

U.S. PATENT DOCUMENTS

| | | | | |
|---|---|---|---|---|
| 5,943,443 A * | 8/1999 | Itonori | ..................... | G06K 9/72 358/403 |
| 6,681,217 B1 * | 1/2004 | Lewak | .............. | G06F 17/30985 707/706 |
| 7,043,488 B1 * | 5/2006 | Baer | ................... | G06F 17/3002 707/999.01 |
| 7,076,494 B1 * | 7/2006 | Baer | ................. | G06F 17/30861 707/999.003 |
| 2003/0204698 A1 * | 10/2003 | Sachedina | ........... | G06F 12/0806 711/170 |
| 2011/0246451 A1 * | 10/2011 | Tatsumura | ........ | G06F 17/30106 707/720 |
| 2013/0042060 A1 * | 2/2013 | Marukame | ....... | G06G 17/30982 711/108 |
| 2014/0325239 A1 * | 10/2014 | Ghose | ................... | G06F 9/3851 713/190 |

(Continued)

*Primary Examiner* — Pavan Mamillapalli
(74) *Attorney, Agent, or Firm* — Cantor Colburn LLP

(57) ABSTRACT

Provided is a method for performing a full-text-based logic operation using hash, the method including: (a) generating a hash data structure having a logic state that varies according to a type of a logic operator, so as to correspond to a first logic operator; (b) inserting hash nodes corresponding to first operand data into buckets that are sequentially allocated from the hash data structure; and (c) if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure and selecting all effective buckets within the hash data structure as resultant values.

13 Claims, 28 Drawing Sheets

(56) References Cited

U.S. PATENT DOCUMENTS

2015/0052170 A1* 2/2015 Murata ............ G06F 17/30091 707/769

2015/0339350 A1* 11/2015 Baggett ............ G06F 17/30339 707/714

* cited by examiner

FIG. 9A

| RECORD ID | NAME | REGION |
|---|---|---|
| 1 | "HYUNDAI KIA CAR" | "SEOUL" |
| 2 | "DAEWOO HYUNDAI AGENCY" | "SEOUL" |
| 3 | "GIMBAP HEAVEN" | "DAEJEON" |
| 4 | "HYUNDAI CAR CAR WASH" | "DAEJEON" |
| 5 | "CAR COMPONENT SHOP" | "BUSAN" |

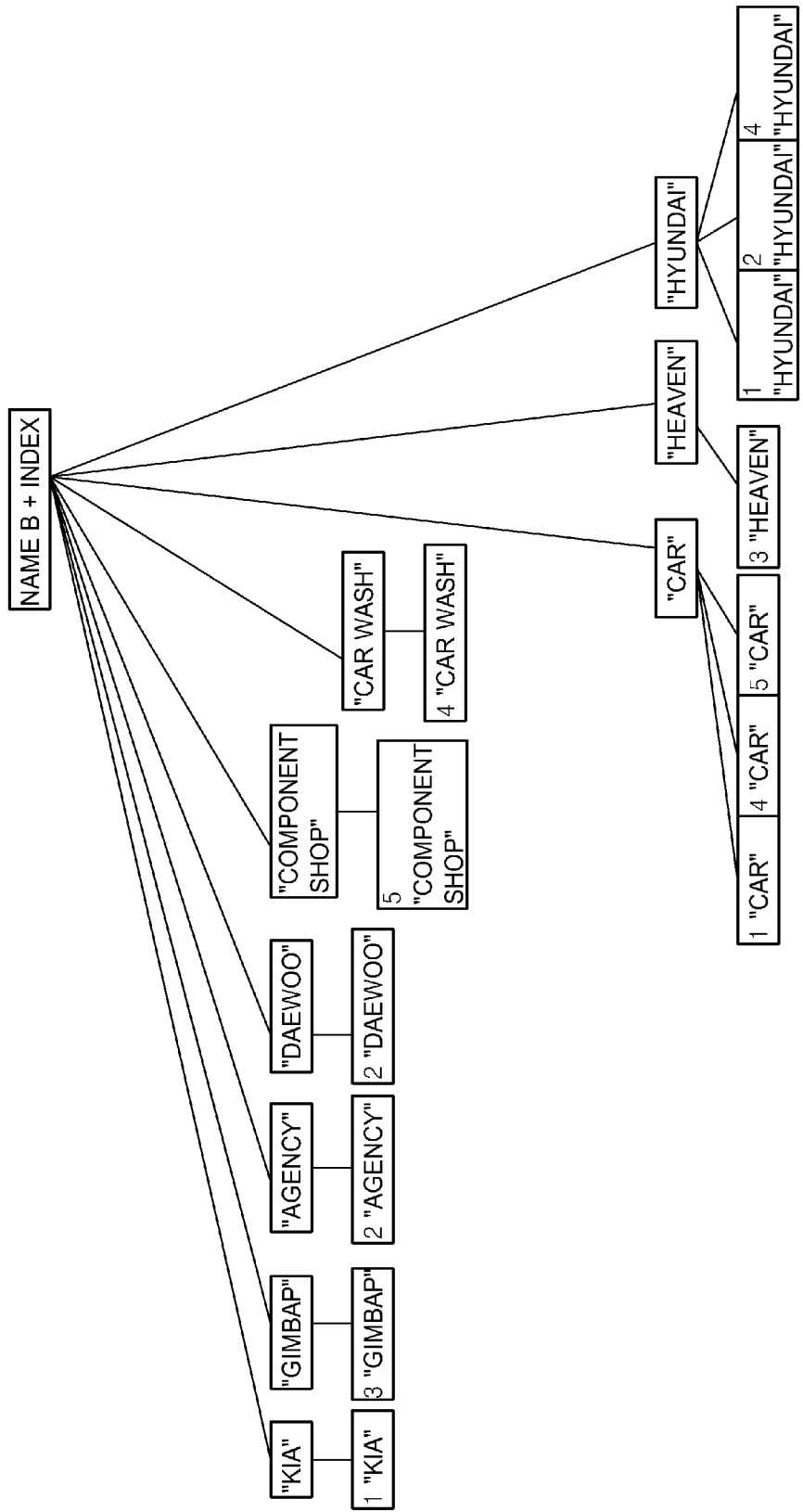

METHOD FOR PERFORMING FULL-TEXT-BASED LOGIC OPERATION USING HASH

TECHNICAL FIELD

The present invention relates to a method for effectively performing a logic operation used to retrieve a keyword from a full-text-based database, and more particularly, to a method for effectively performing a logic operation using minimum resources on a mobile terminal in which system resources are limited.

BACKGROUND ART

Information retrieval systems are systems that quickly retrieve information suitable for a user's need from a database in which information or data predicted to be required by a user are previously collected, processed and handled and are accumulated in a shape in which the information or data can be easily found and that provide the information to the user.

Information retrieval systems are classified into reference retrieval, fact retrieval, and full-text retrieval according to types of information accumulated in the database. Reference retrieval is to retrieve bibliographic record of a document that mainly handles a subject to be found by a user, and online information retrieval systems, such as DIRLOG, BRS, and the like, correspond to reference retrieval. Fact retrieval is to retrieve general data, numerical data and fact data, and chemical abstracts service on-line (CAS), whereby chemicals are retrieved, electronic information service (EMIS), whereby data of a semiconductor material are retrieved, and the like, belong to the category of fact retrieval. Full-text retrieval is to retrieve bibliographic data, a corresponding text or all of an original text from a database in which a full-text of a document is accumulated, as needed. LEXIS or WESTLAW in which law information can be retrieved, NEXIS in which paper articles can be retrieved, Dow Jones Retrieval, and the like, belong to the category of full-text retrieval.

Large-capacity computing resources are required for a logic operation used to retrieve a keyword from a full-text-based database. However, computing resources that may be used in a mobile environment are limited such that the speed of retrieval is decreased when the logic operation is performed.

Thus, in a full-text-based retrieval system on a mobile terminal, the usage number of logic operators provided is very limited such that effective keyword retrieval cannot be provided.

DETAILED DESCRIPTION OF THE INVENTION

Technical Problem

The present invention provides a method for performing a full-text-based logic operation using hash, whereby a method of evaluating a full-text-based logic operator using hash is proposed so that an optimum AND/OR logic operation can be performed using minimum resources on a mobile terminal in which system resources are limited and so that logic operation resultant data can be obtained from the outside after the logic operation has been performed.

Technical Solution

According to an aspect of the present invention, there is provided a method for performing a full-text-based logic operation using hash, the method including: (a) generating a hash data structure having a logic state that varies according to a type of a logic operator, so as to correspond to a first logic operator; (b) inserting hash nodes corresponding to first operand data into buckets that are sequentially allocated from the hash data structure; and (c) if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure and selecting all effective buckets within the hash data structure as resultant values.

According to another aspect of the present invention, there is provided a computer-readable recording medium having recorded thereon a hash data structure and a user interface for performing a full-text-based logic operation using hash, wherein the hash data structure includes: a hash function generated by a MOD operation in which a hash identifier (ID) is used as an input value; a hash table that is a list set of hash nodes that designate starting positions of buckets corresponding to hash keys; and a bucket block in which each of buckets includes a hash ID and a pointer for a hash chain, and wherein the user interface includes: a StartUp module generating a hash data structure having a logic state that varies according to a type of a logic operator, so as to correspond to a first logic operator and allocating and initializing memory; an Insert module inserting hash nodes corresponding to first operand data into buckets that are sequentially allocated from the hash data structure; and a Logic module, if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure.

DESCRIPTION OF THE DRAWINGS

FIGS. 9A through 9C illustrate a table and indexes according to embodiments of the present invention.

MODE OF THE INVENTION

The present invention will now be described more fully with reference to the accompanying drawings, in which exemplary embodiments of the invention are shown.

Figure 1:
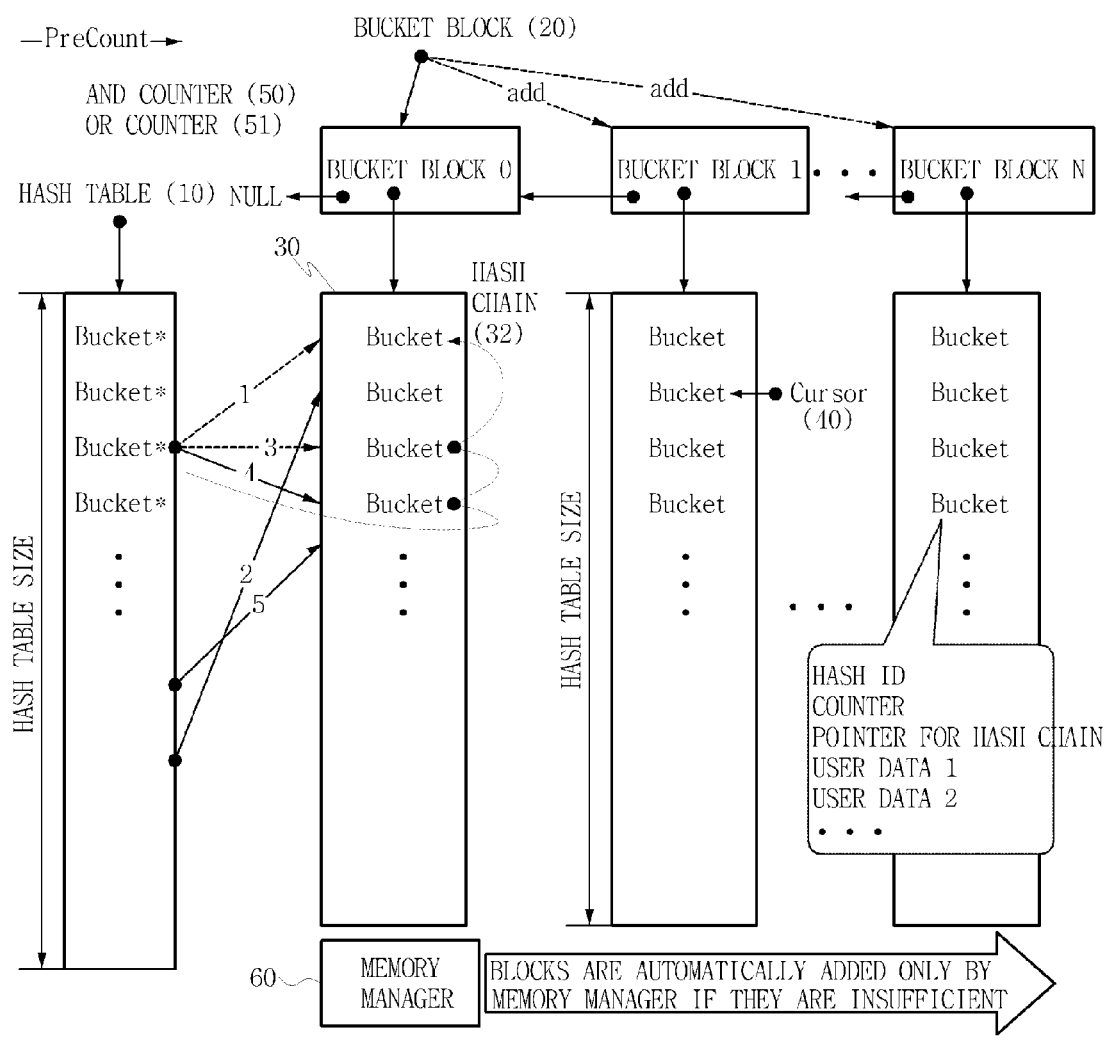
FIG. 1 illustrates a hash data structure used in a method for performing a full-text-based logic operation using hash according to an embodiment of the present invention.

A hash data structure used in a method for performing a full-text-based logic operation using hash according to an embodiment of the present invention will now be described with reference to FIG. 1.

The hash data structure used in the present invention may include a hash function (not shown), a hash table 10, a bucket block 20, a curser 40, an AND counter 50, and an OR counter 51.

The hash function is a function in which hash keys are generated by inputting a hash identifier (ID). The hash function may be generated by a MOD operation. Also, a record ID of a full-text database is used as the hash ID.

The hash table 10 is a set of lists of hash nodes that designate starting positions of buckets 30 that correspond to hash keys. The size of the hash table 10 is determined using PreCount input by a user and may be determined as a prime number that is a little greater than the size of the bucket block 20 for uniform distribution of the buckets 30.

The buckets 30 that are a data structure inserted into hash each includes a hash ID and a pointer for a hash chain 32 so as to retrieve a corresponding bucket 30 when hashes collide with each other. Counters for determining resultant values of logic operations and data (user data 1 and user data 2) to be input by the user to the hash nodes may be included in the buckets 30.

The bucket block 20 is a memory buffer that is previously generated using PreCount that is the predictable number of buckets 30 to be inserted into hash.

The cursor 40 is used to designate positions of the buckets 30 on the bucket block 20 and supports results of logic operations to be easily obtained from the outside.

The AND counter 50 is used to count the number of resultant values of AND logic operations, and the OR counter 51 is used to count the number of resultant values of OR logic operations.

In the present invention, a module that is a memory manager 60 is set, and the memory manager 60 manages a memory used in hash, in particular, manages a function of automatically adding the bucket block 20 and position information in which current buckets are to be inserted. The memory manager 60 previously designates the size of the bucket block 20 according to a predetermined range and determines a value depending on a range to which a PreCount value input from the user belongs, as the size of the bucket block 20 to be generated. Here, the size of the bucket block 20 may be determined as $2^n$ (where, n is an integer number) so as to facilitate memory management. PreCount input by the user may be designated so that two to three buckets 30 can be present within the hash chain 32. It is effective to use the number of hash nodes in a set corresponding to first operand data of a logic operation through an index.

When the number of actually-inserted buckets 30 is greater than the size of the bucket block 20, the memory manager 60 generates a new bucket block 20 automatically. Thus, in a hash data structure according to the related art, a new memory space needs to be allocated whenever buckets 30 are generated when hashes collide with each other, and the buckets need to be configured in a connection list shape. However, according to the present invention, the buckets 30 that have been already generated within the bucket block 20 may be sequentially allocated and may be configured in the connection list shape.

User interfaces used in the present invention include StartUp, CleanUp, Insert, Logic, ChangeLogic, Size, and Next.

(1) StartUp Module

Figure 2:
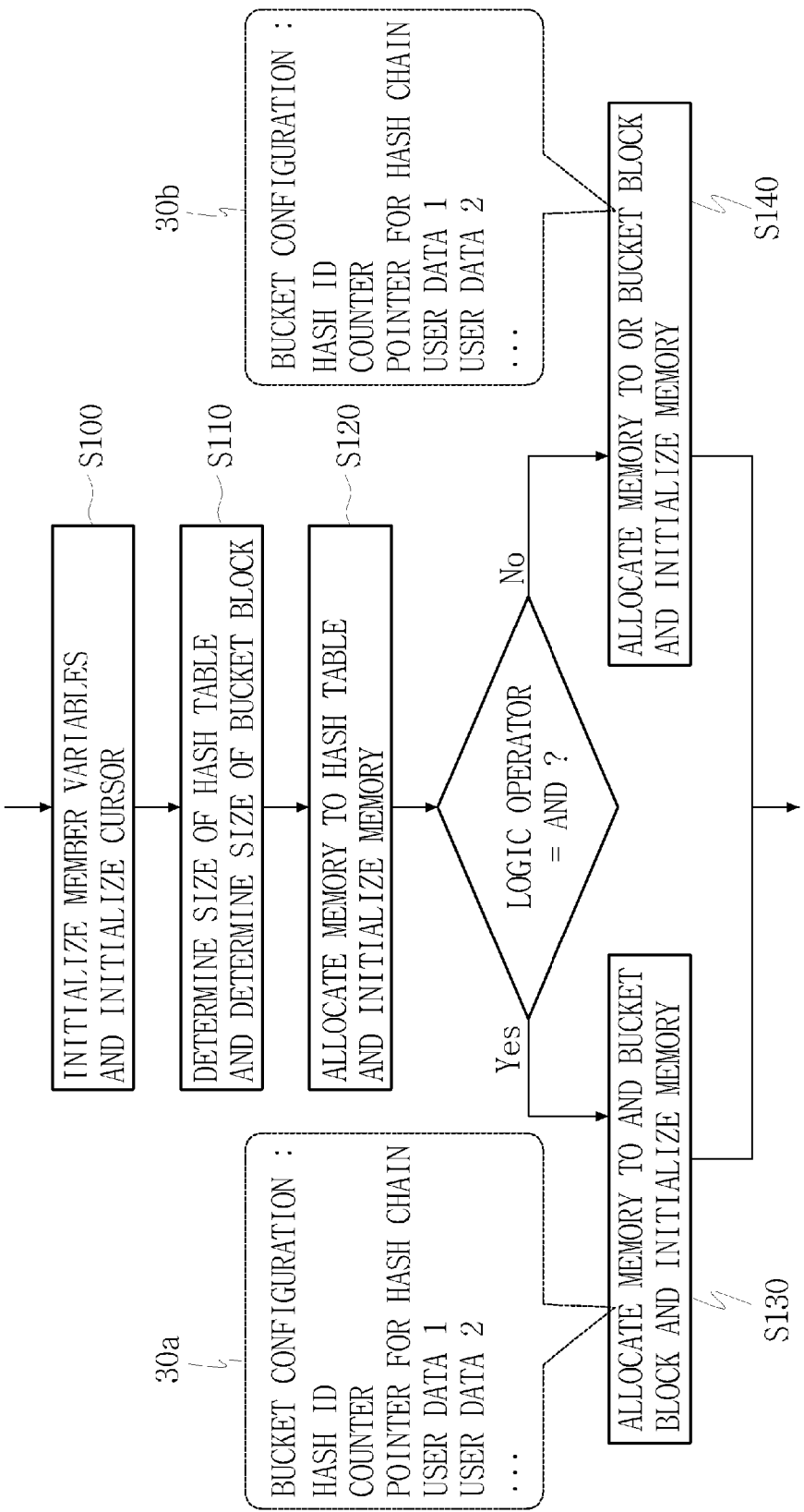
FIG. 2 illustrates an operation of performing a StartUp module among user interfaces used in the present invention.

As illustrated in FIG. 2, a StartUp module performs initialization and resource allocation so as to use hash.

An input value consists of a logic operator, the number of operators and the predictable number PreCount of buckets.

The logic operator is AND or OR.

The number of operators is the number in which AND or OR logic operators appear continuously. For example, when a logic operation "A AND B AND C" is present on sets A, B and C, the number of operators is 2.

The predictable number PreCount of buckets is used as a significant input value used to determine the size of the hash table 10 and the size of the bucket block 20.

An operation to be performed by the StartUp module will be described below.

All member variables of a logic operation Hash are initialized (S100).

The size of the bucket block 20 and the size of the hash table 10 are determined using the value PreCount input by the user (S110). The memory manager 60 previously designates the size of the bucket block 20 according to a predetermined range and determines a value depending on a range to which a PreCount value input from the user belongs, as the size of the bucket block 20 to be generated. Here, the size of the bucket block 20 may be determined as $2^n$ (where, n is an integer number) so as to facilitate memory management. Also, the size of the hash table 10 is determined as a prime number that is a little greater than the size of the bucket block 20.

A memory is allocated to the hash table 10 using the determined size of the hash table 10, and the memory is initialized (S120).

Subsequently, a hash data structure having a logic state that varies according to the types AND or OR of input logic operators, is generated (S130, S140). That is, types of buckets are classified into buckets 30a for an AND logic operation and buckets 30b for an OR logic operation, and counters are additionally included in the buckets 30a for the AND logic operation. The counters are used to perform an AND logic operation. In a hash data structure in an AND logic state, only the AND logic operation may be performed, and in a hash data structure in an OR logic state, only the OR logic operation may be performed. However, if the type of the logic operator is changed into another one, the logic state of the hash data structure may be changed by a ChangeLogic module that will be described below.

(2) Clean Up Module

Figure 3:
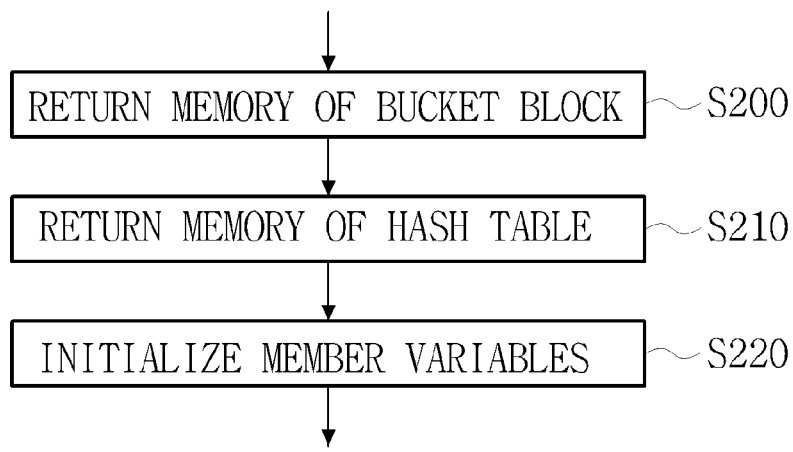
FIG. 3 illustrates an operation of performing a CleanUp module among user interfaces used in the present invention.

As illustrated in FIG. 3, a CleanUp module performs a function of completing all logic operations and of releasing resources within hash.

There is no input value.

An operation to be performed by the CleanUp module will be described below.

The memory of the bucket block 20 is returned (S200), and the memory of the hash table 10 is returned (S210), and all member variables are initialized (S220).

(3) Insert Module

Figure 4:
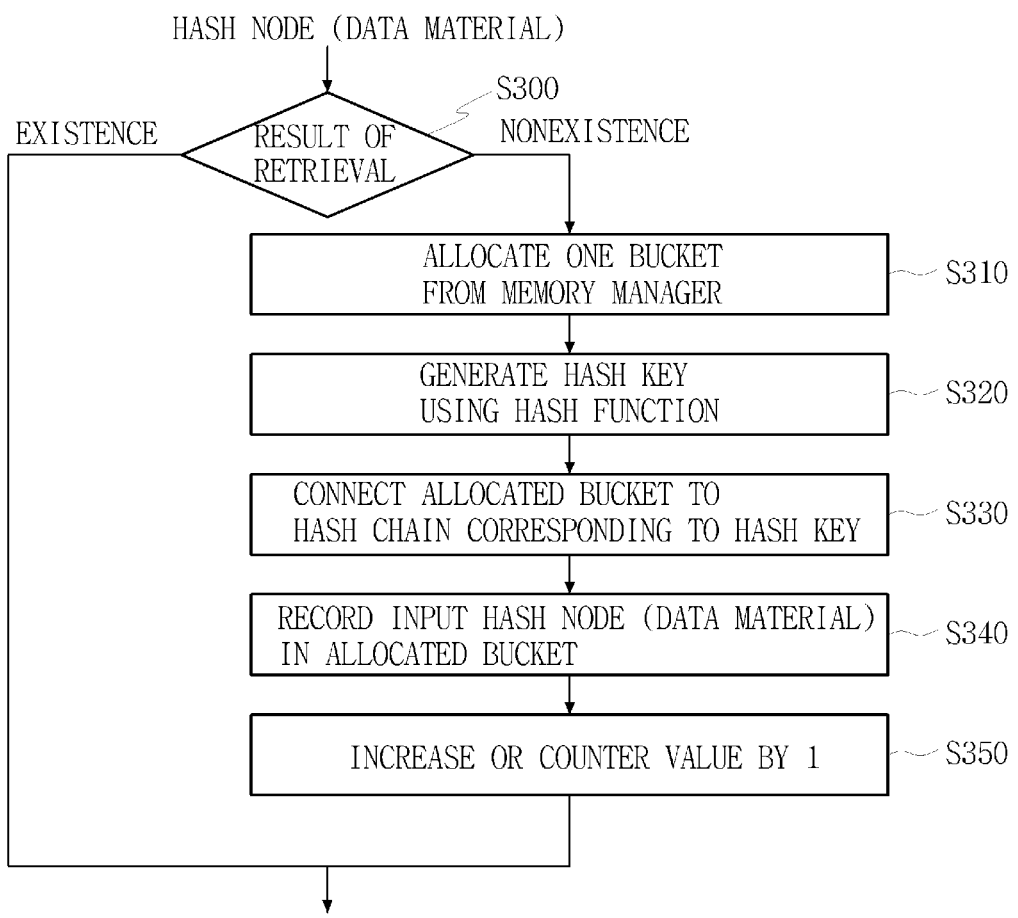
FIG. 4 illustrates an operation of performing an Insert module among user interfaces used in the present invention.

As illustrated in FIG. 4, an Insert module inserts first operand data into the initialized hash data structure so as to perform a logic operation. If there is an operation "A AND B" on sets A and B, the Insert module performs a function of inserting one among elements of the set A into hash.

An input value is user data materials to be input as hash nodes.

Hash node (data material): consists of a hash ID to be used in the hash function and other data input by the user.

An operation to be performed by the Insert module will be described below.

First, it is retrieved whether data to be input that already exists in hash (S300). That is, it is retrieved whether buckets having the same hash ID as a hash ID of the input hash nodes exist in hash.

As a result of retrieval, if there is no data that already exists in hash, no operation is performed.

As a result of retrieval, if no data exist in hash, one bucket is allocated from the memory manager 60 (S310), and hash keys are generated using the hash function (S320), and the allocated bucket is connected to a hash chain that corresponds to the hash keys (S330), and the input data is recorded in the allocated bucket (S340).

An OR counter value is increased by 1 (S350).

(4) Logic Module

Figure 5:
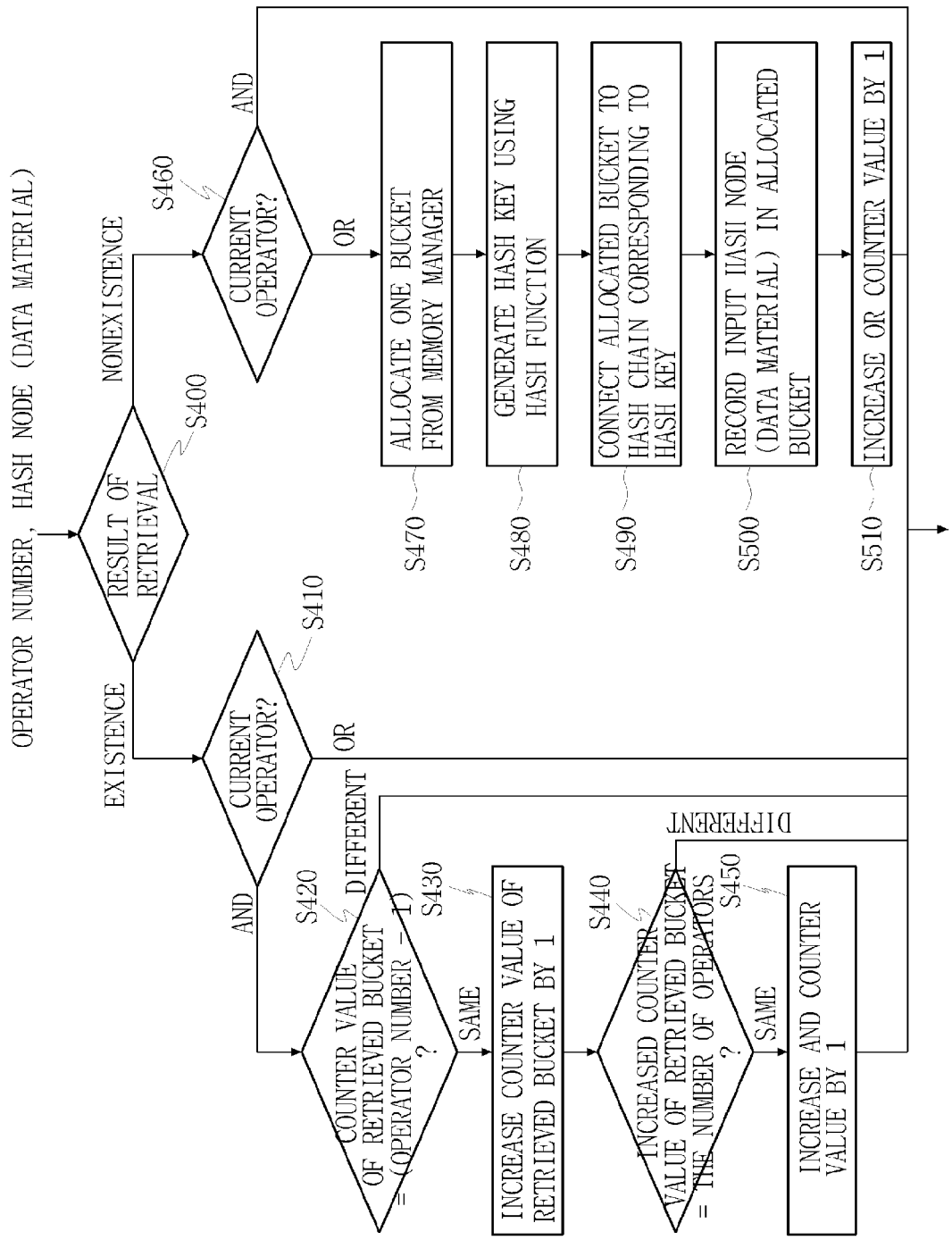
FIG. 5 illustrates an operation of performing a Logic module among user interfaces used in the present invention.

As illustrated in FIG. 5, a Logic module performs a logic operation by inputting an operand placed after the logic operator. If an operation "A AND B" is present on sets A and B, the Logic module performs an AND operation function in hash on one among elements of the set B, and if an operation "A OR B" is present on the sets A and B, the Logic module performs an OR operation function in hash on one among the elements of the set B.

An input value consists of an operator number and a hash node (data material).

The operator number: means the order of logic operators in continuous same logic operations. For example, when a logic operation "A AND B AND C AND D" is present, the number of operators is 3, and an operator number is 1 when a first logic operation (A AND B) is performed, and an operator number is 2 when a second logic operation ((the result of the first logic operation) AND C), and an operator number is 3 when a third logic operation ((the result of the second logic operation) AND D).

Hash node (data material): consists of a hash ID to be used in the hash function and other data input by the user.

When the type of a current logic operator is AND, the Logic module selects buckets that coincide with hash nodes corresponding to second operand data among buckets inserted by the Insert module in the hash data structure or buckets selected as resultant values of the previous operation, as resultant values. On the other hand, when the type of the current logic operator is OR, if hash nodes corresponding to the second operation data are not retrieved from the hash data structure, the Logic module performs an operation of inserting the hash nodes into buckets that are sequentially allocated from the hash data structure. A detailed operation thereof will be described below.

First, retrieval is performed whether data to be input already exists in hash (S400). That is, it is retrieved whether buckets having the same hash ID as the hash ID of the input hash nodes exist in hash.

As a result of retrieval in Operation S400, if it is retrieved that data already exists in hash, it is checked whether a current logic operator is AND or OR (S410). The current logic operator is set as a logic operator input by the StartUp module, and if the ChangeLogic module is performed, the current logic operator is changed into a newly-input logic operator.

As a result of retrieval in Operation S400, if it is retrieved that data to be input already exists in hash and the current logic operator is AND, when a counter value of the retrieved buckets is the same as a value obtained by subtracting 1 from the input operator number (buckets that are resultant values of the AND logic operation up to the previous operation) (S420), the counter value of the retrieved buckets is increased by 1 (a resultant value of a current operation) (S430), if the increased counter value of counters of the retrieved buckets coincides with the number of operators input by the StartUp module or the ChangeLogic module (final resultant values of the AND operation) (S440), an AND counter value is increased by 1 (S450). In contrast, when the counter value of the retrieved buckets is different from the value obtained by subtracting 1 from the number of input operators or the increased counter value of the retrieved buckets is different from the number of operators input by the StartUp module or the ChangeLogic module, no operation is performed.

If there is no result of retrieval in Operation S400, it is checked whether the current logic operator is AND or OR (S460).

If there is no result of retrieval in Operation S400 and the current logic operator is AND, no operation is performed.

If there is no result of retrieval in Operation S400 and the current logic operator is OR, one bucket is allocated from the memory manager 60 (S470), and hash keys are generated using a hash function (S480), and the allocated bucket is connected to a hash chain corresponding to the hash keys (S490), and input data is recorded in the allocated bucket (S500), and then an OR counter value is increased by 1 (S510).

(5) ChangeLogic Module

A ChangeLogic module is used when a logic operator is changed. The ChangeLogic module performs a function of changing a logic state of hash. If an operation "(A AND B) OR C" is present on sets A, B and C, the ChangeLogic module performs a function of changing the logic state of hash from AND to OR after the AND logic operation has been performed.

An input value consists of a logic operator and the number of operators.

Logic operator: AND or OR

Figure 6:
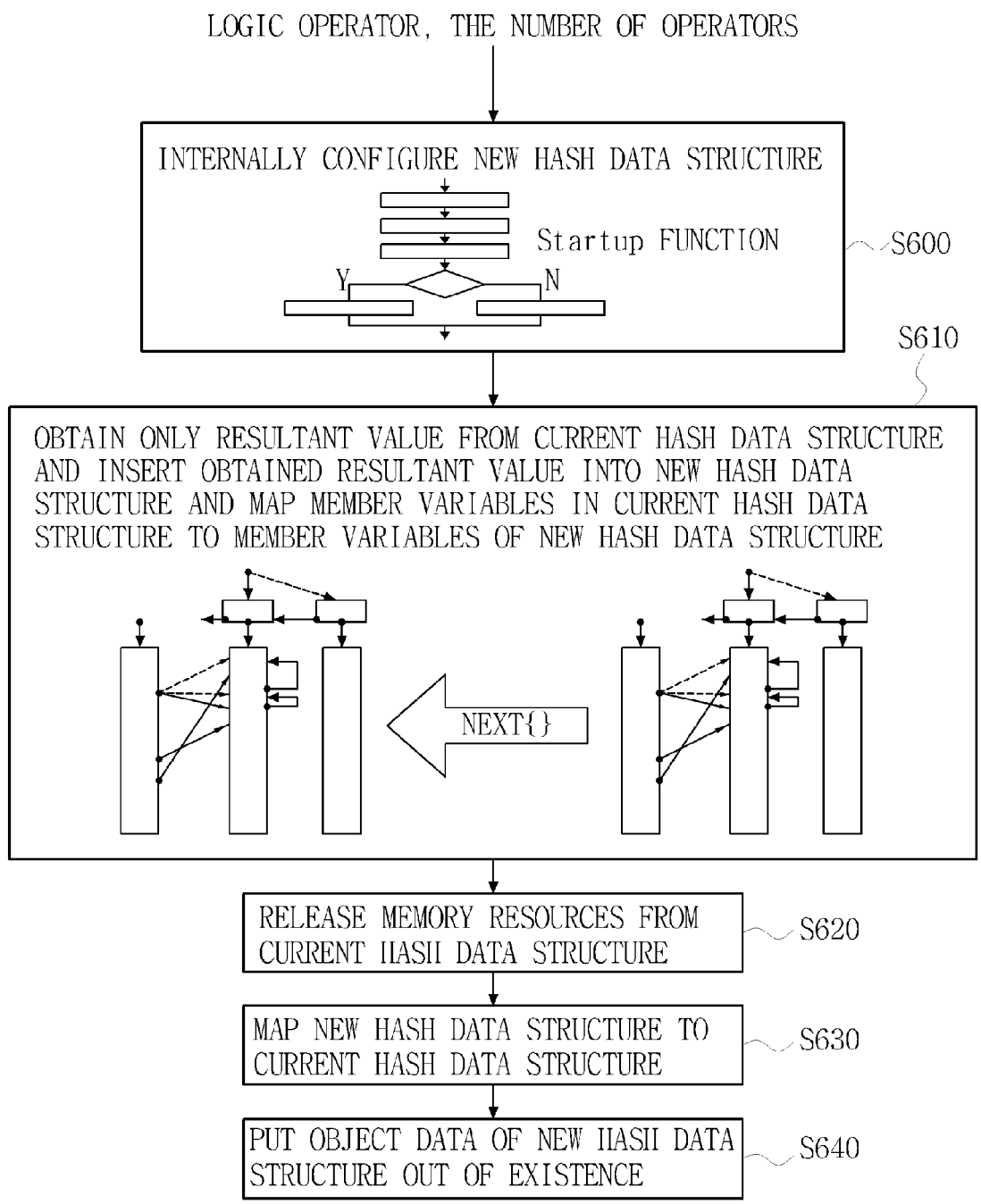
FIG. 6 illustrates an operation of performing a ChangeLogic module among user interfaces used in the present invention.

The number of operators: the number in which AND or OR operators appear continuously An operation of changing AND to OR using the ChangeLogic module will be described with reference to FIG. 6.

First, a new hash data structure is internally configured using the logic operator and the number of operators that are input values and the predictable number PreCount of buckets set in the current hash data structure (S600). In this case, the above-described StartUp module is used.

Subsequently, only resultant values are obtained from the current hash data structure and are inserted into a new hash data structure using a Next module that will be described below, and member variables in the current hash data structure are mapped to member variables of the new hash data structure (S610).

Subsequently, memory resources are released from the current hash data structure using the Clean Up module (S620).

Subsequently, the member variables and pointers of the internally-generated new hash data structure are mapped to the current hash data structure (S630), and only object data of the internally-generated new hash data structure is put out of existence (S640). In this case, the new hash data structure is not Cleaned Up.

In order to implement the ChangeLogic module, a buffer (hash table, bucket block) in which user's input data among members inside hash is stored needs to be allocated from Heap using pointers. Thus, the logic state of the current hash data structure can be changed into a new logic state.

By performing the above-described operation, when the logic operator is changed from AND to OR, the size of a memory allocated to the hash data structure can be remarkably reduced.

Since the size of the allocated memory is not reduced while the operation of changing from OR to AND is performed by the ChangeLogic module, the logic state of the current hash data structure is simply changed. In this case, the buckets of the current hash data structure are changed into the buckets 30a for the AND logic operation.

(6) Size Module

Figure 7:
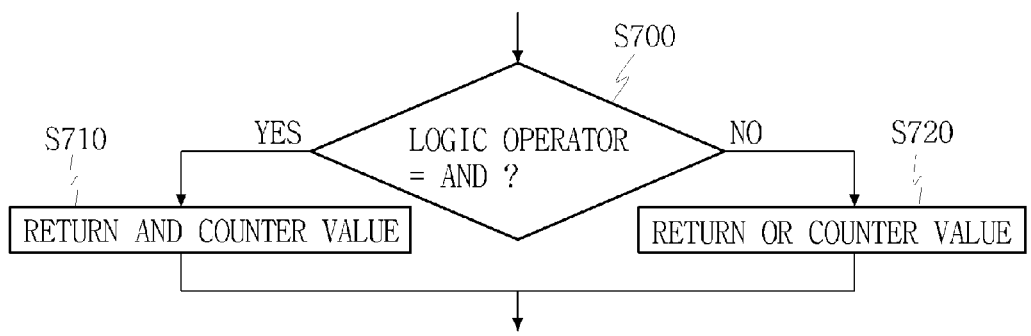
FIG. 7 illustrates an operation of performing a Size module among user interfaces used in the present invention.

Referring to FIG. 7, a Size module performs a function of returning the number of results of logic operations to the user.

There is no input value.

It is checked whether a current logic operator is AND or OR (S700), and if the logic state of the hash data structure is an AND logic state, an AND counter value is returned (S710), and if the logic state of the hash data structure is an OR logic state, an OR counter value is returned (S720).

(7) Next Module

Figure 8:
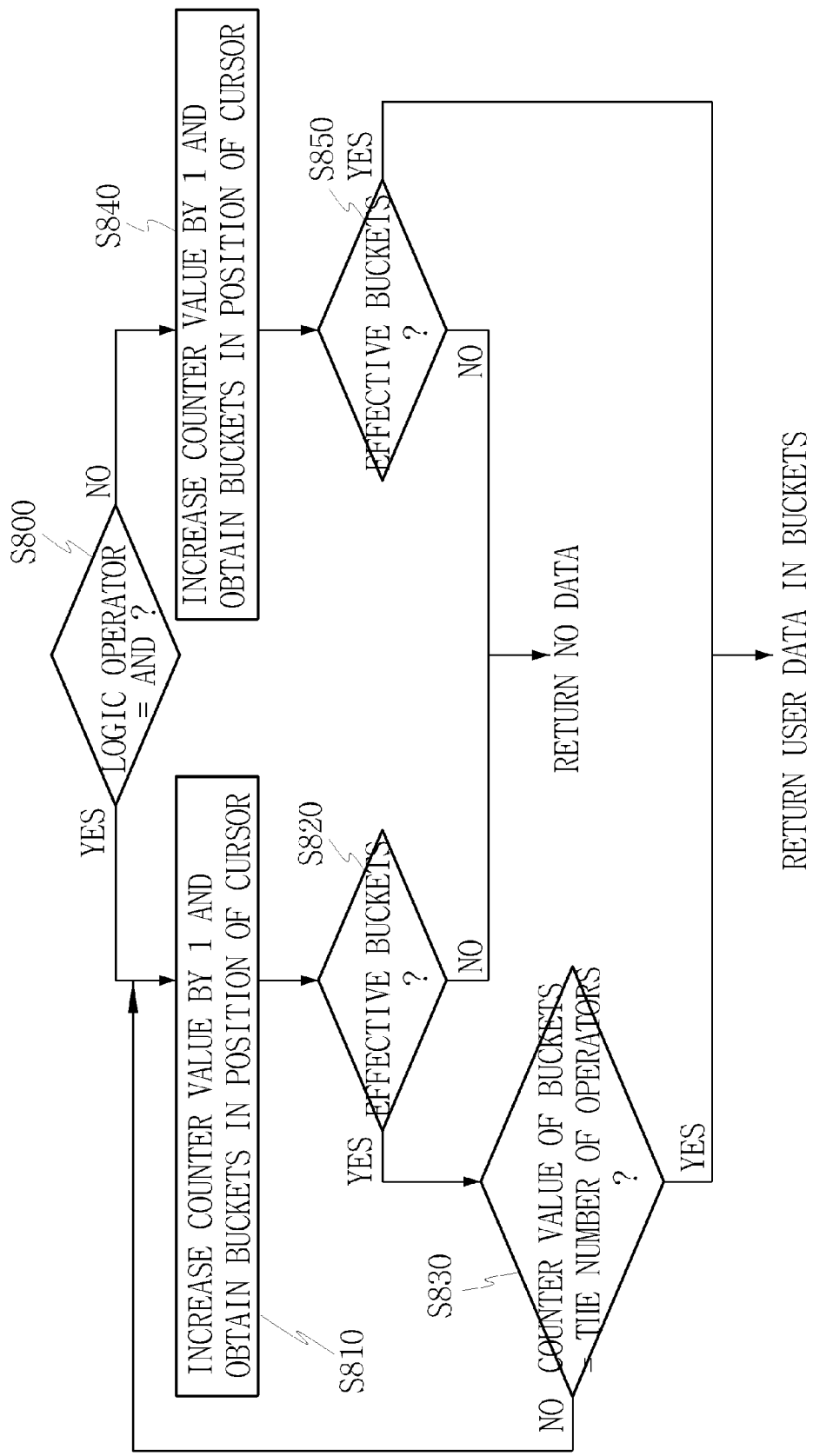
FIG. 8 illustrates an operation of performing a Next module among user interfaces used in the present invention.

Referring to FIG. 8, a Next module performs a function of returning results of logic operations to the user after the logic operations have been performed.

There is no input value.

In case of the Next module, when the type of the current logic operator is AND (when the current hash data structure is after the AND logic operation has been performed), only buckets having the same number of counters as the number of AND logic operators are retrieved from the hash data structure and are set as final resultant values, and user data within the buckets in which a cursor is placed, is output one by one. When the type of the current logic operator is OR (when the current hash data structure is after the OR logic operation has been performed), all effective buckets within the hash data structure are set as final resultant values, and user data within the buckets in which the cursor is placed, is output one by one. A detailed operation thereof will be described below.

It is checked whether the current logic operator is AND or OR (S800), and if the logic state of the hash data structure is an AND logic state, a cursor value is increased by 1, and buckets are obtained in the position of the cursor (S810).

If the obtained buckets are not effective, all bucket blocks within the hash data structure are rounded, 'No Data' is returned to the user (S820).

If the obtained buckets are effective, a counter value within the buckets and the number of operators are compared with each other, and if the counter value is the same as the number of operators, user data within the buckets is returned (S830), and if the counter value is not the same as the number of operators, the operation goes back to Operation S810.

If the logic state of the hash data structure is an OR logic state, the cursor value is increased by 1, and the buckets are obtained in the position of the cursor (S840).

If the obtained buckets are effective, user data within the buckets is returned (S850), and if the obtained buckets are not effective, all bucket blocks within the hash data structure are rounded, and 'No Data' is returned to the user.

Hereinafter, the method for performing the full-text-based logic operation using hash according to the present invention will be described with reference to the following examples.

Figure 9C:
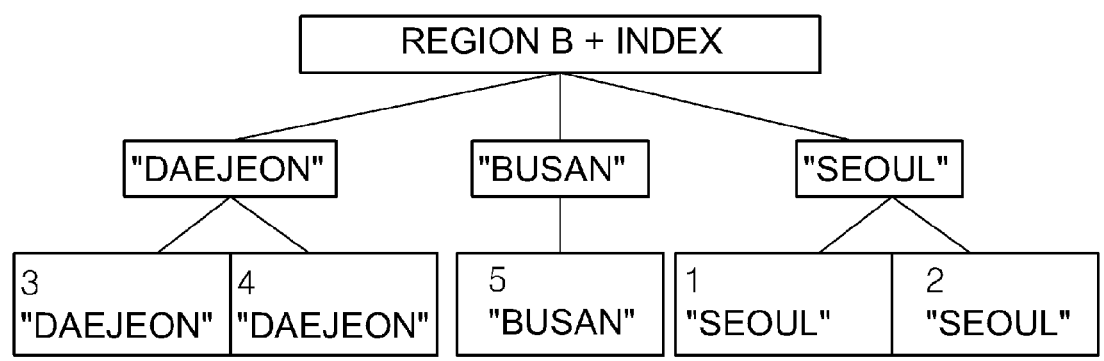

It is assumed that each of "name B+index" and "region B+index" regarding "table A" shown in FIG. 9A is shown in FIGS. 9B and 9C.

Example 1

Retrieve a Record Including "Hyundai" and "Car" Regarding "Name"

Retrieval inquiry will be expressed below in a logic manner.

name ("hyundai" AND "car")

Figure 10A:
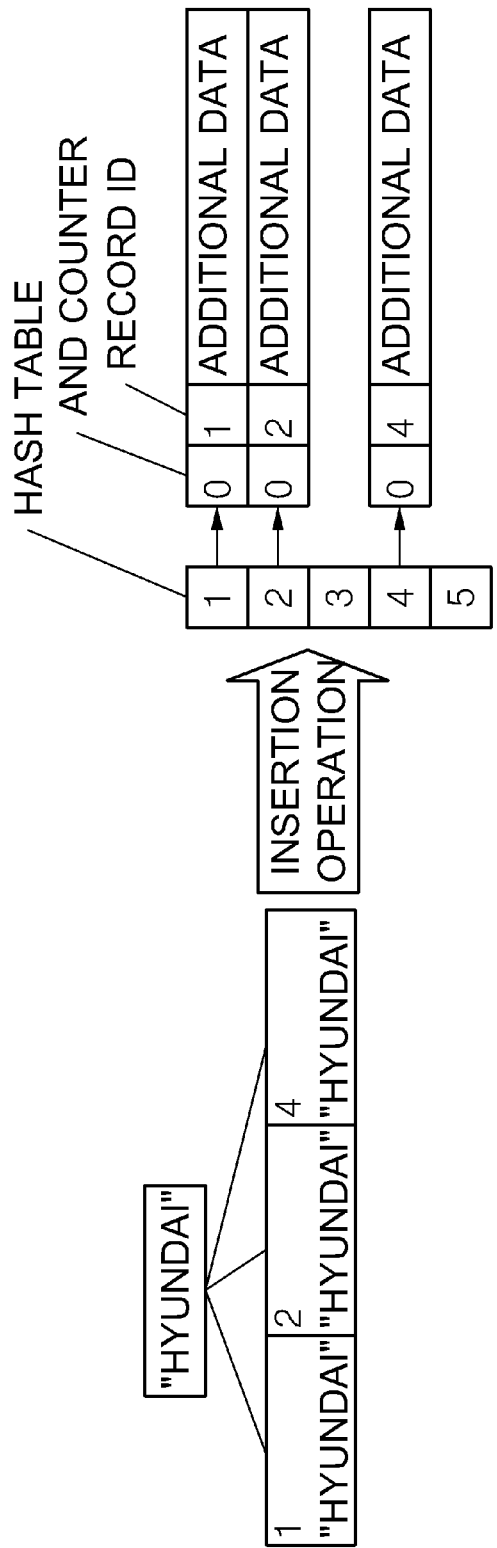
FIGS. 10A through 14E illustrate insertion operations, logic operations and results of retrieval according to embodiments of the present invention.

First, as shown in FIG. 10A, a keyword "hyundai" is retrieved from an index so that an insertion operation into hash is performed.

Figure 10B:
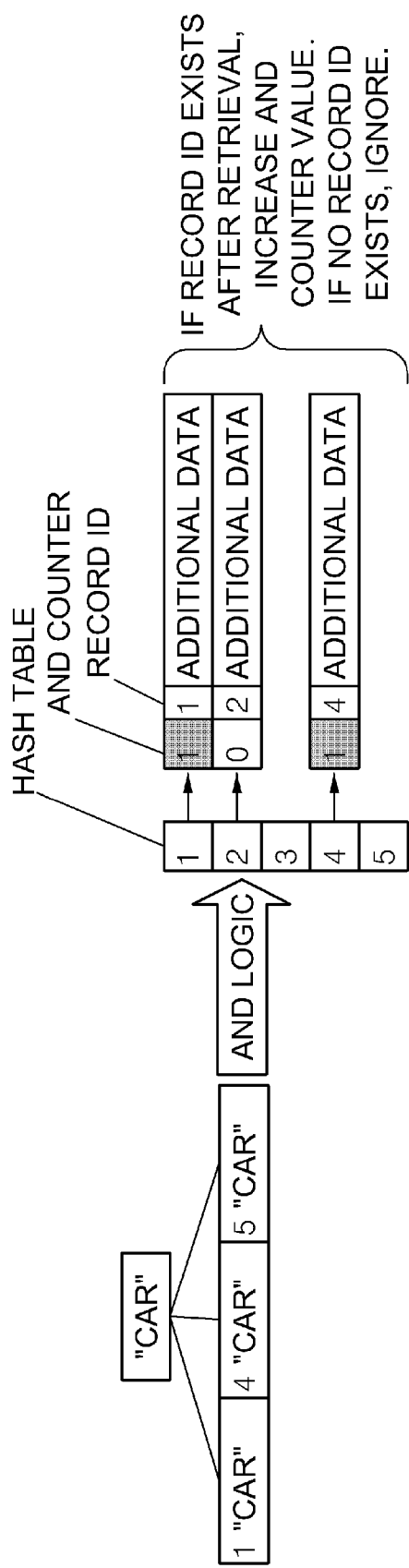

Next, as shown in FIG. 10B, a keyword "car" is retrieved from the index so that an AND logic operation is performed on hash.

Figure 10C:
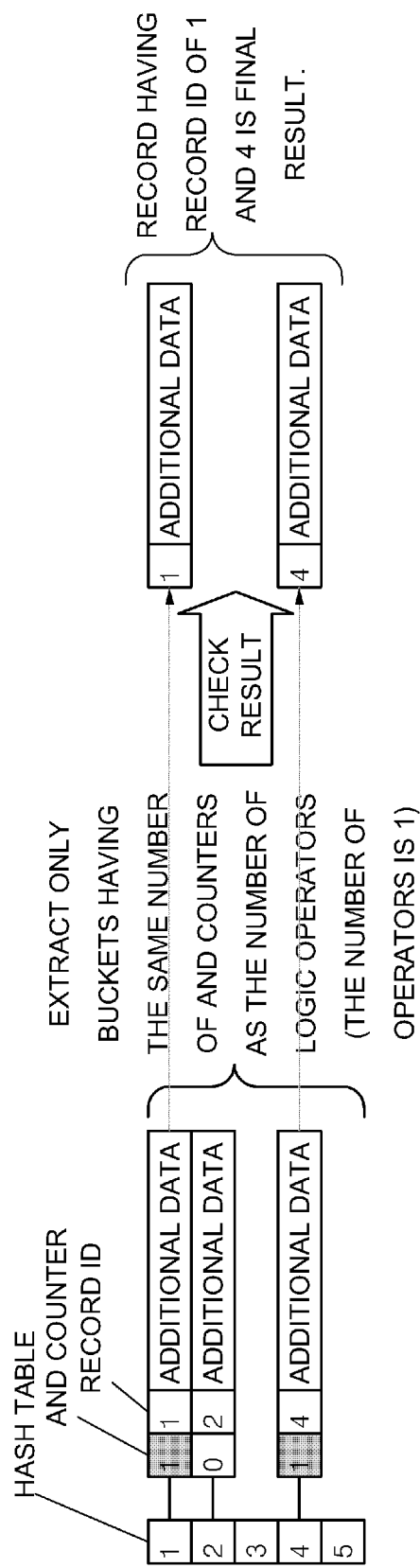

Then, results of retrieval are shown in FIG. 10C.

A program code of Example 1 will be described below:

```
LogicHash hash;   //hash object
hash.StartUp( LOGIC_AND, 1, 100 );   //logic operator,
    the number of
operators, the predictable number of buckets
    hash.Insert(  {1 user data}  );   //insertion operation
    hash.Insert(  {2 user data}  );
    hash.Insert(  {4 user data}  );
    hash.Logic(  1, {1, user data}  );   //AND logic operation
    hash.Logic(  1, {4, user data}  );
    hash.Logic(  1, {5, user data}  );
    int size = hash.Size( );   //obtain the number of results
    for(int i=0; i<size; i++) {   //check result of retrieval
        {bucket} = hash.Next( );
    }
    hash.CleanUp( );   //release hash resources
```

Example 2

Retrieve a Record Including "Hyundai" or "Car" Regarding "Name"

Retrieval inquiry will be expressed below in a logic manner.

name ("hyundai" OR "car")

Figure 11A:
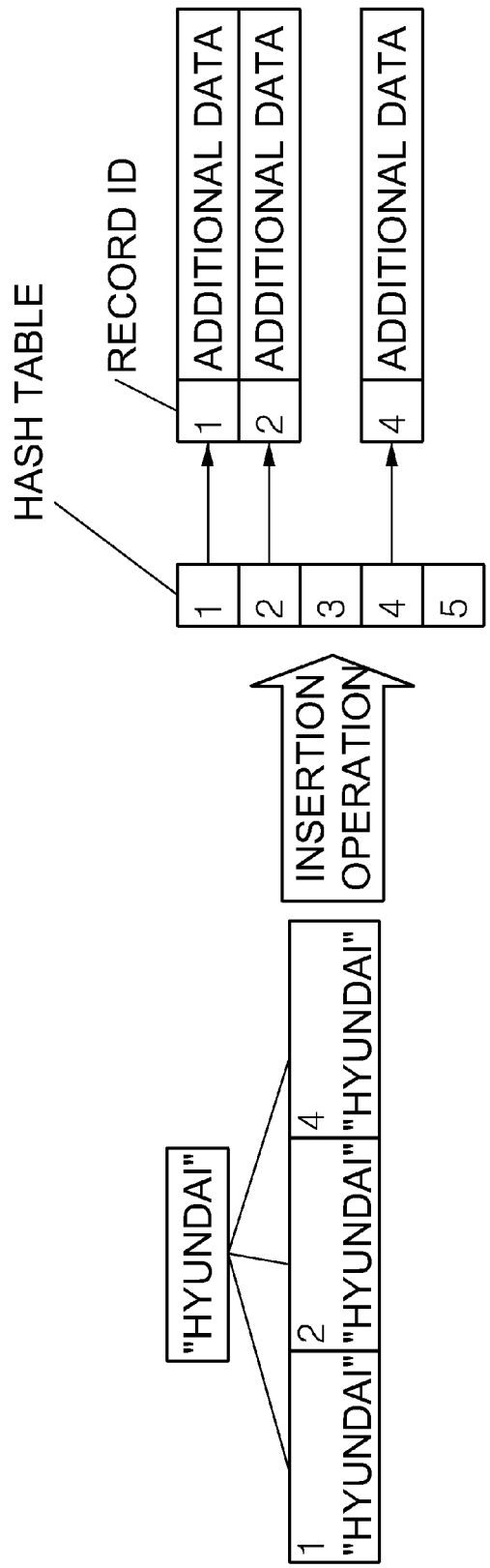

First, as shown in FIG. 11A, a keyword "hyundai" is retrieved from an index so that an insertion operation into hash is performed.

Figure 11B:
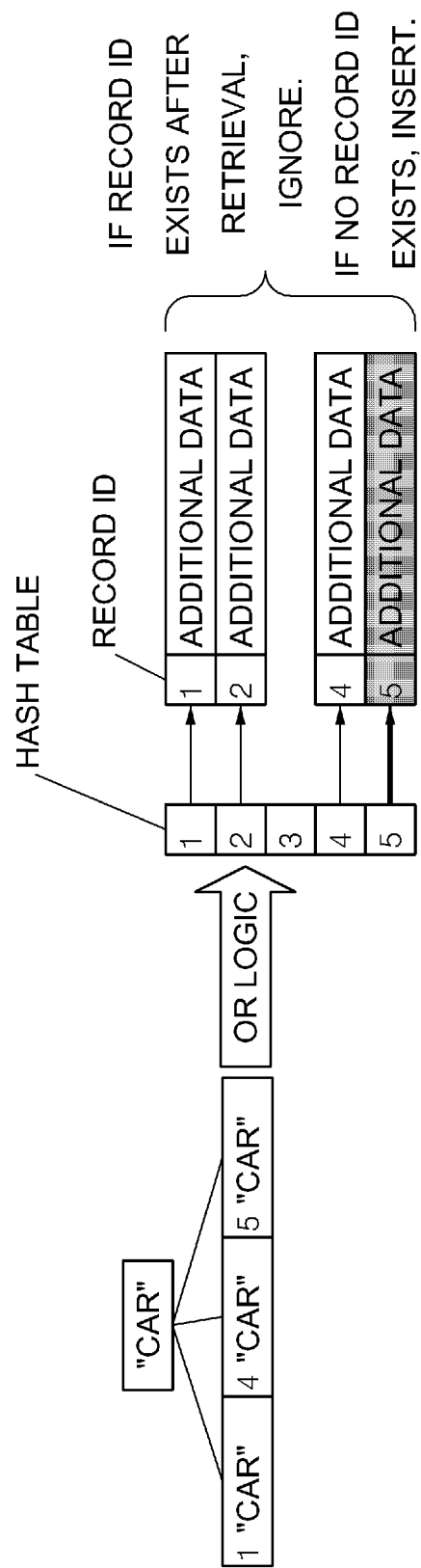

Next, as shown in FIG. 11B, a keyword "car" is retrieved from the index so that an OR logic operation is performed on hash.

Figure 11C:
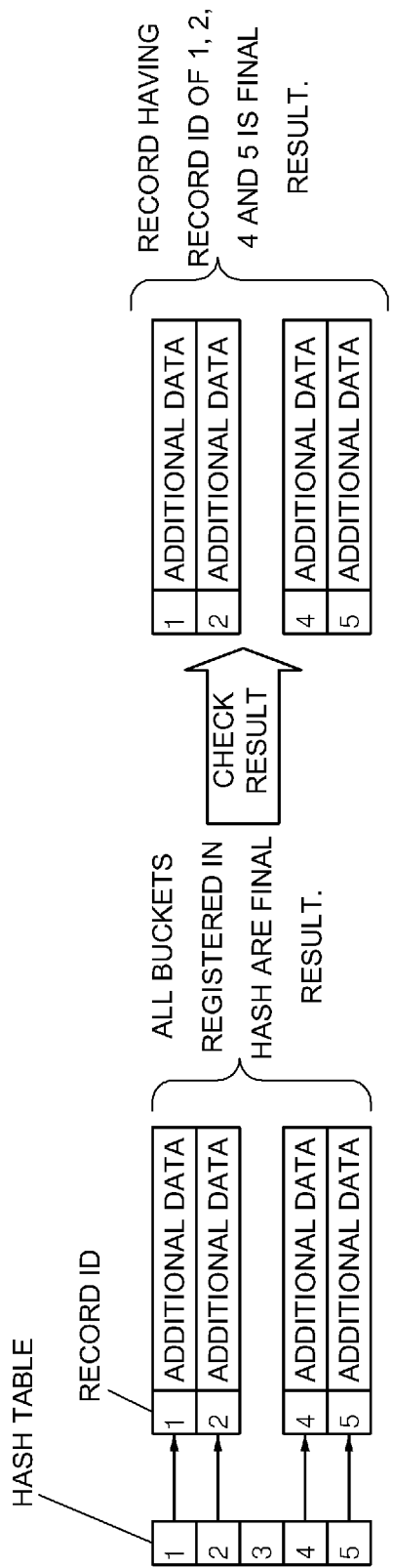

Then, results of retrieval are shown in FIG. 11C.

A program code of Example 2 will be described below:

```
LogicHash hash;   //hash object
hash.StartUp( LOGIC_OR, 1, 100 );   //logic operator,
    the number of
operators, the predictable number of buckets
    hash.Insert(  {1 user data}  );   //insertion operation
    hash.Insert(  {2 user data}  );
    hash.Insert(  {4 user data}  );
    hash.Logic(  1, {1 user data}  );   //OR logic operation
    hash.Logic(  1, {4 user data}  );
    hash.Logic(  1, {5 user data}  );
    int size = hash.Size( );   //obtain the number of results
    for(int i=0; i<size; i++) {   //check result of retrieval
        {bucket} = hash.Next( );
    }
    hash.CleanUp( );   //release hash resources
```

Example 3

Retrieve a Record Including "Hyundai" Regarding "Name" and "Seoul" Regarding "Region"

Retrieval inquiry will be expressed below in a logic manner.

name ("hyundai") AND region ("seoul")

Figure 12A:
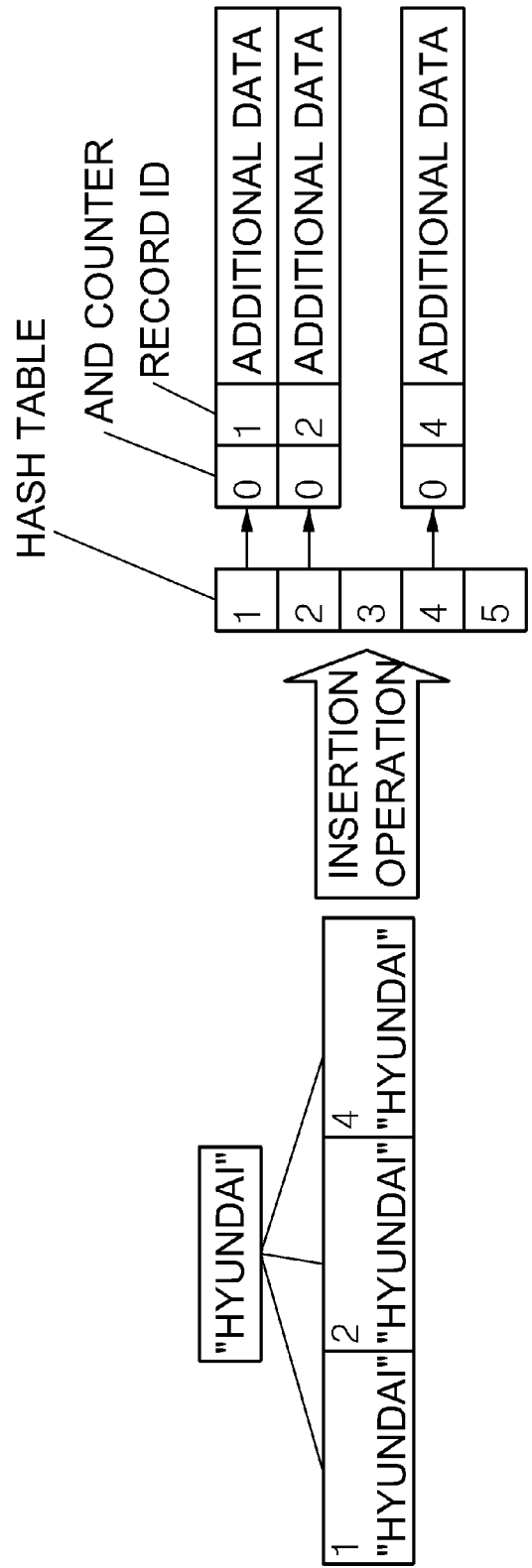
Figure 12B:
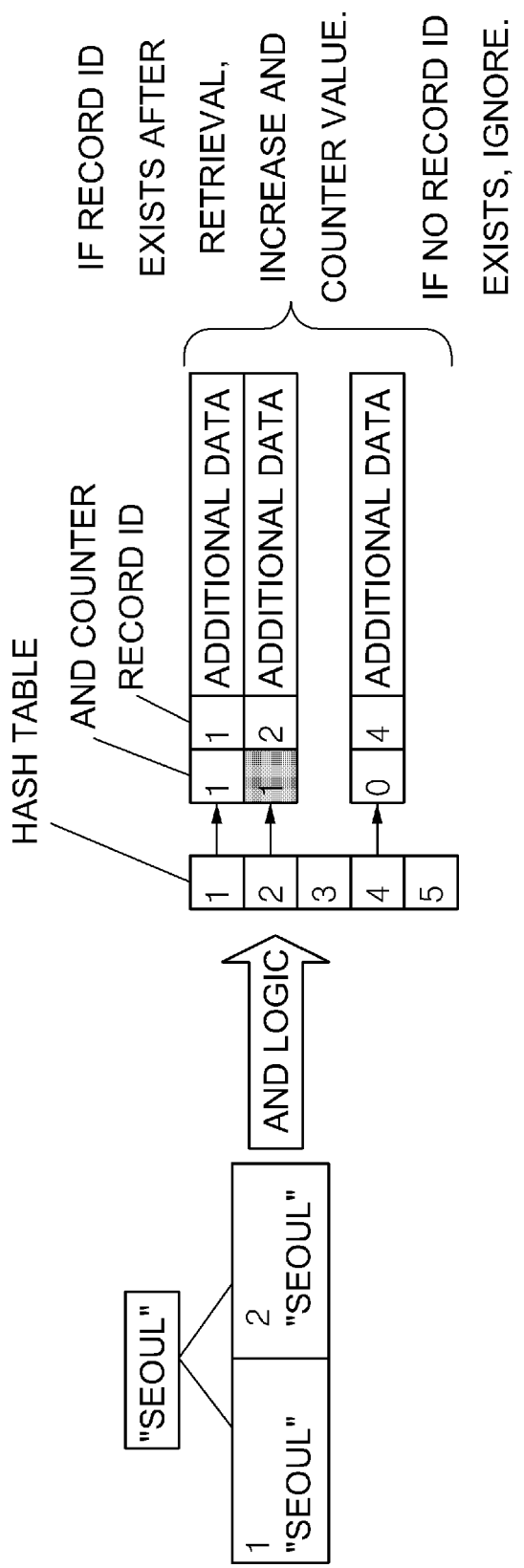

First, as shown in FIG. 12A, a keyword "hyundai" is retrieved from an index so that an insertion operation into hash is performed.

Next, as shown in FIG. 10B, a keyword "seoul" is retrieved from the index so that an AND logic operation is performed on hash.

Figure 12C:
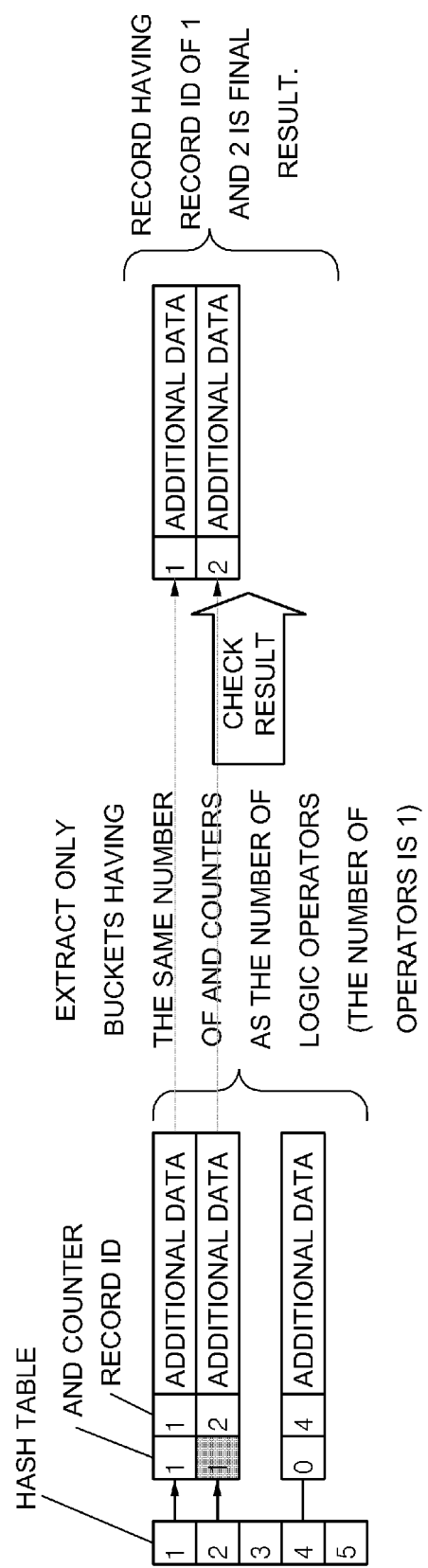

Then, results of retrieval are shown in FIG. 12C.

A program code of Example 3 will be described below:

```
LogicHash hash;    //hash object
hash.StartUp( LOGIC_AND, 1, 100  );    //logic operator,
the number of
operators, the predictable number of buckets
    hash.Insert(   {1 user data}   );    //insertion operation
    hash.Insert(   {2 user data}   );
    hash.Insert(   {4 user data}   );
    hash.Logic(  1, {1 user data}   );    //AND logic operation
    hash.Logic(  1, {2 user data}   );
    int size = hash.Size( );    //obtain the number of results
    for(int i=0; i<size; i++) {    //check result of retrieval
        {bucket} = hash.Next( );
    }
hash.CleanUp( );    //release hash resources
```

Example 4

Retrieve a Record Including "Hyundai", "Car" and "Car Wash" Regarding "Name"

Retrieval inquiry will be expressed below in a logic manner.

name ("hyundai" AND "car" AND "car wash")

Figure 13A:
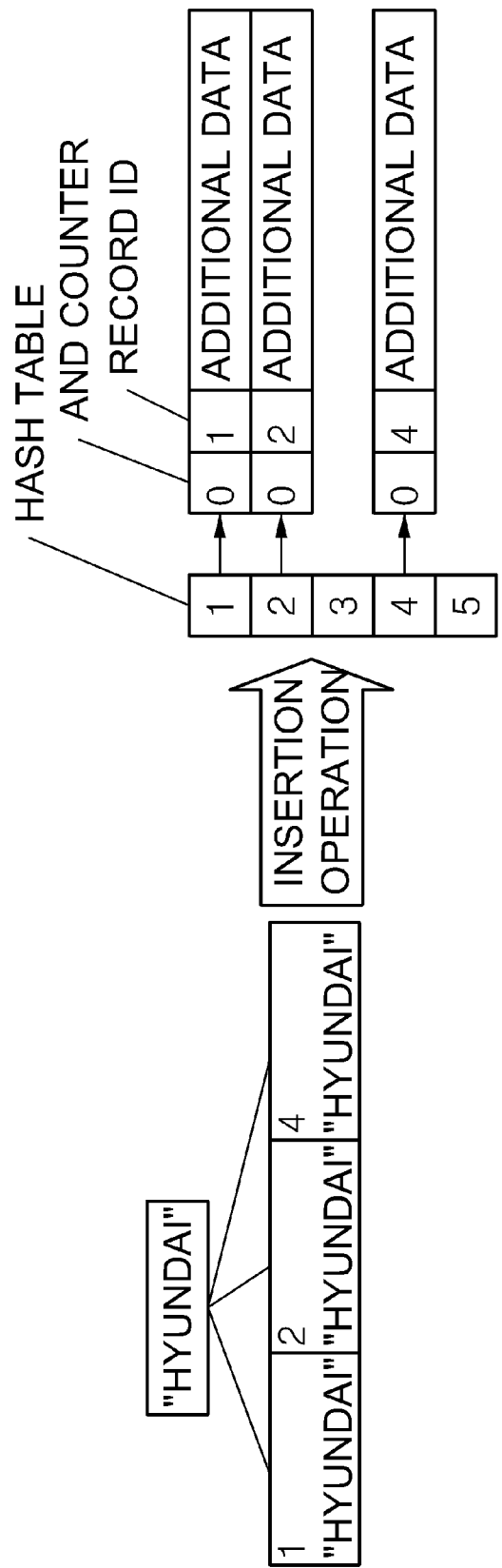

First, as shown in FIG. 13A, a keyword "hyundai" is retrieved from an index so that an insertion operation into hash is performed.

Figure 13B:
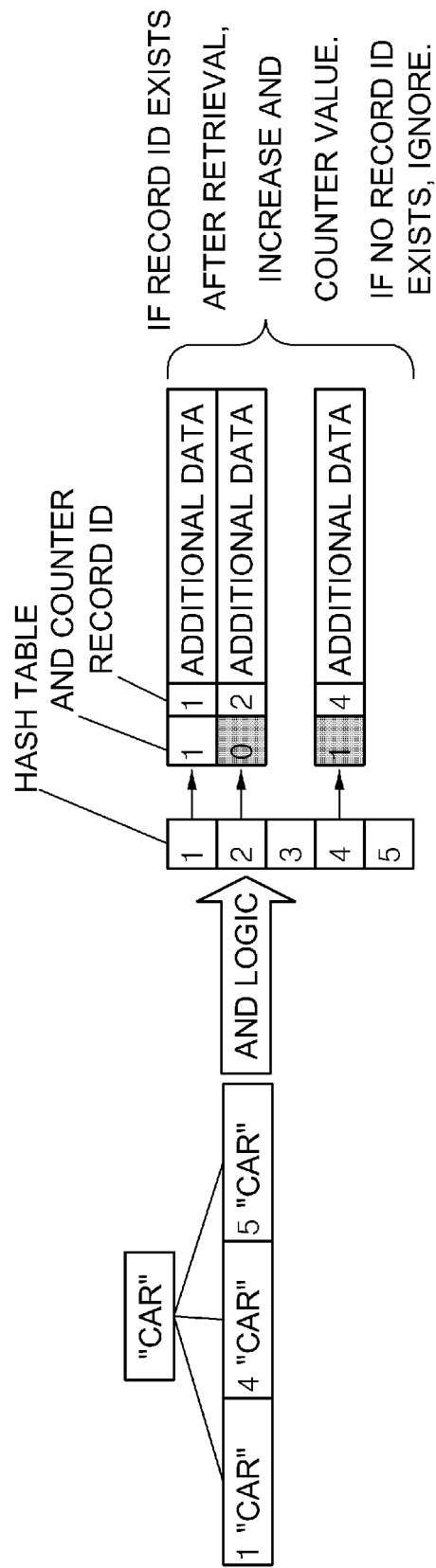

Next, as shown in FIG. 13B, a keyword "car" is retrieved from the index so that a first AND logic operation is performed on hash.

Figure 13C:
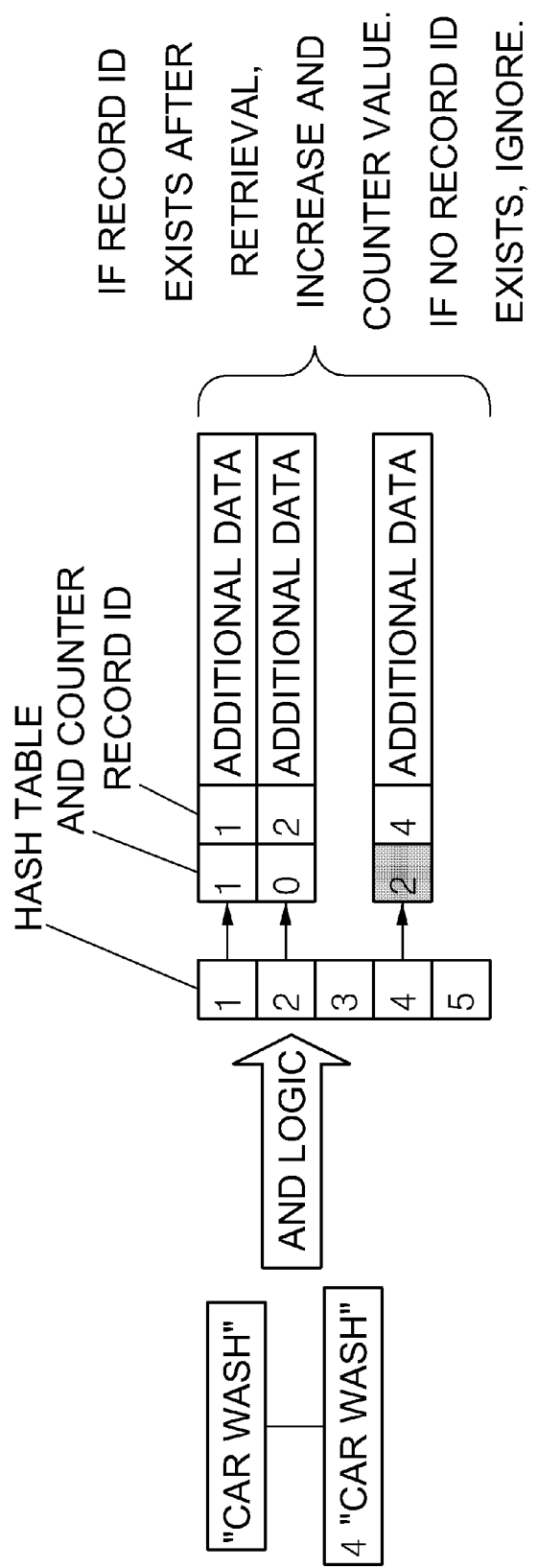

Next, as shown in FIG. 13C, a keyword "car wash" is retrieved from the index so that a second AND logic operation is performed on hash.

Figure 13D:
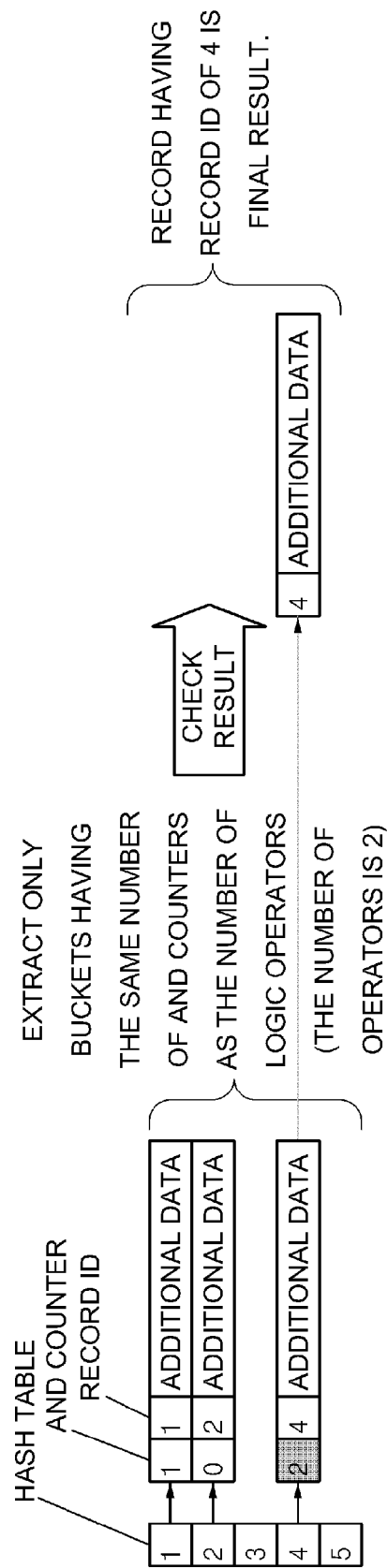

Then, results of retrieval are shown in FIG. 13D.

A program code of Example 4 will be described below:

```
LogicHash hash;    //hash object
hash.StartUp( LOGIC_AND, 2, 100  );    //logic operator,
the number of
operators, the predictable number of buckets
    hash.Insert(   {1 user data}   );    //insertion operation
    hash.Insert(   {2 user data}   );
    hash.Insert(   {4 user data}   );
    hash.Logic(  1, {1 user data}   );    //first AND logic operation
    hash.Logic(  1, {4 user data}   );
    hash.Logic(  1, {5 user data}   );
    hash.Logic(  1, {4 user data}   );    //second AND logic operation
    int size = hash.Size( );    //obtain the number of results
    for(int i=0; i<size; i++) {    //check result of retrieval
        {bucket} = hash.Next( );
    }
hash.CleanUp( );    //release hash resources
```

Example 5

Retrieve a Record Including "Hyundai" or "Heaven" Regarding "Name" and "Daejeon" Regarding "Region"

Retrieval inquiry will be expressed below in a logic manner.

name ("hyundai" OR "heaven") AND region ("daejeon")

Figure 14A:
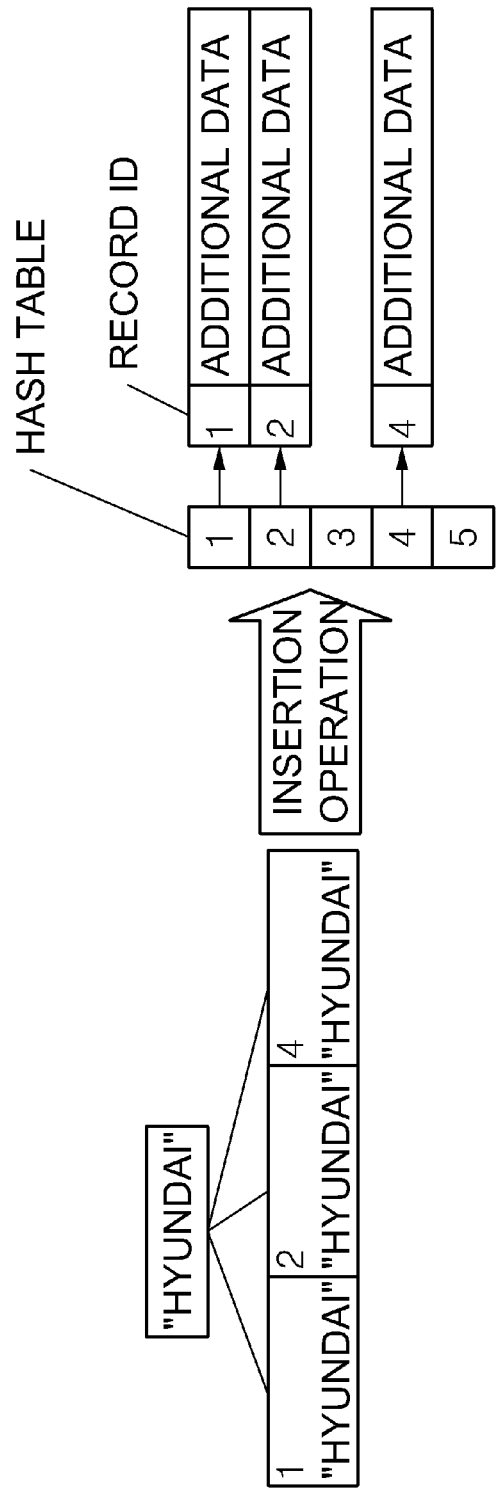

First, as shown in FIG. 14A, a keyword "hyundai" is retrieved from an index so that an insertion operation into hash is performed.

Figure 14B:
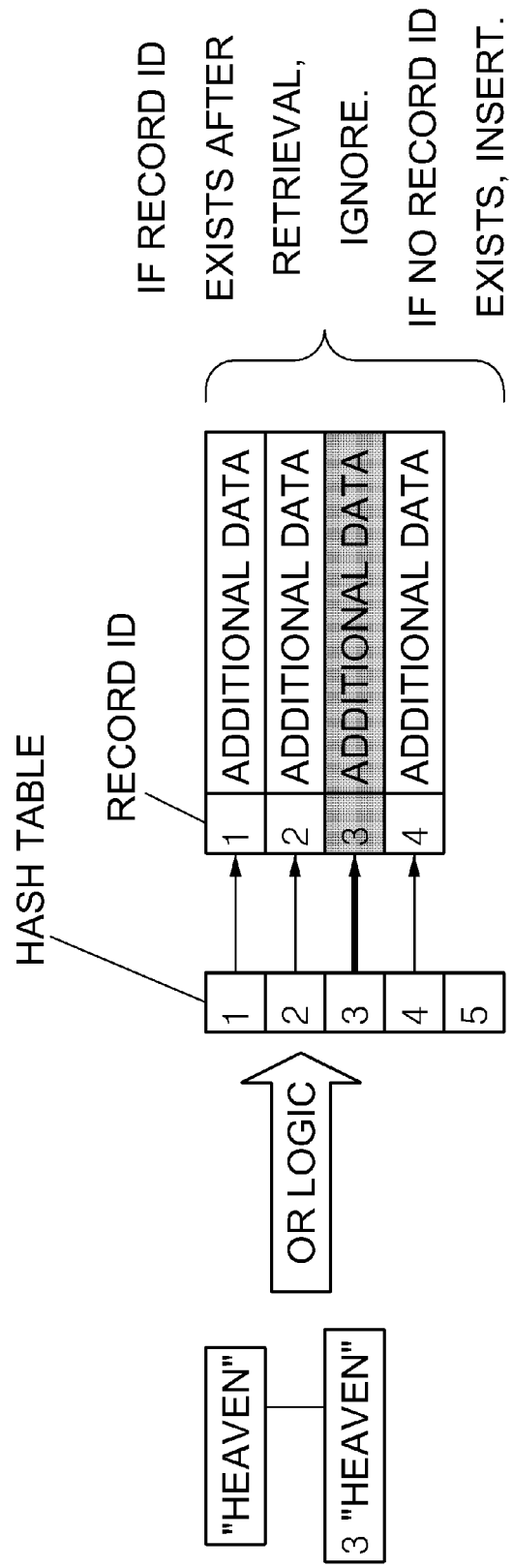

Next, as shown in FIG. 14B, a keyword "heaven" is retrieved from the index so that an OR logic operation is performed on hash.

Figure 14C:
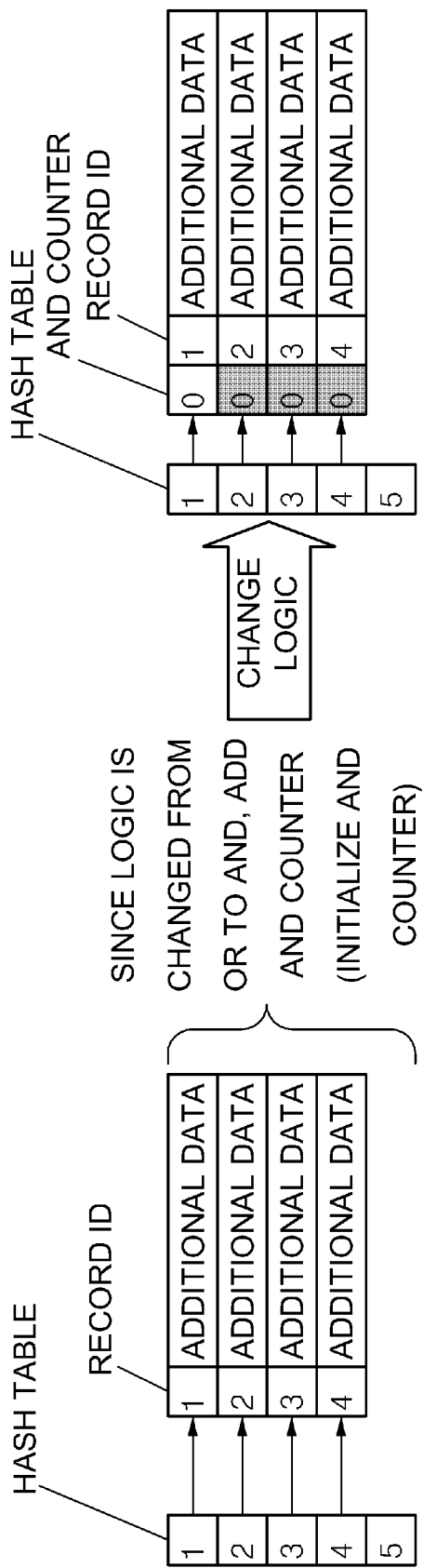

Next, as shown in FIG. 14C, since a logic operator is changed from OR to AND, a logic state of the hash data structure is changed.

Figure 14D:
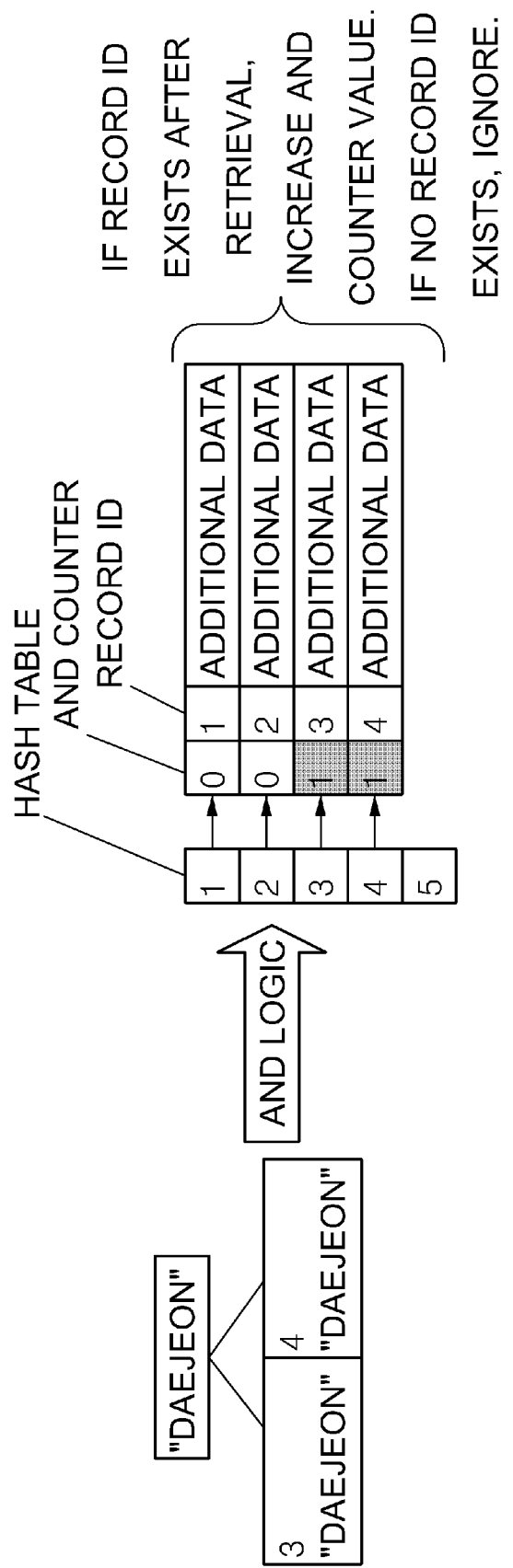

Next, as shown in FIG. 14D, a keyword "daejeon" is retrieved from the index so that an AND logic operation is performed on hash.

Figure 14E:
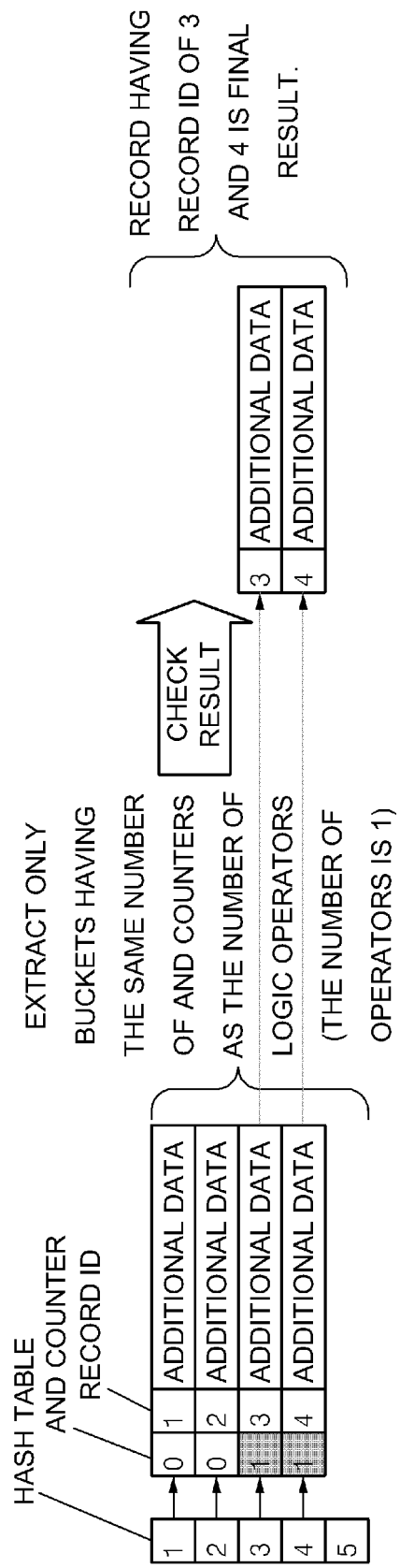

Then, results of retrieval are shown in FIG. 14E.

A program code of Example 5 will be described below:

```
LogicHash hash;    //hash object
hash.StartUp( LOGIC_OR, 1, 100  );    //logic operator,
the number of
operators, the predictable number of buckets
    hash.Insert(   {1 user data}   );    //insertion operation
    hash.Insert(   {2 user data}   );
    hash.Insert(   {4 user data}   );
    hash.Logic(  1, {3 user data}   );    //OR logic operation
    hash.ChangeLogic( LOGIC_AND, 1  );    //change logic state
    of hash data
structure
    hash.Logic(  1, {3 user data}   );    //AND logic operation
    hash.Logic (  1, {4 user data}   );
    int size = hash.Size( );    //obtain the number of results
    for(int i=0; i<size; i++) {    //check result of retrieval
        {bucket} = hash.Next( );
    }
hash.CleanUp( );    //release hash resources
```

The embodiments of the present invention can be recorded in a recording medium used in a general-use computer including a personal computer (PC). Examples of the recording medium include magnetic storage media (e.g., ROM, floppy disks, hard disks, etc.), optical recording media (e.g., CD-ROMs, or DVDs), electrical recording media (e.g., flash memory, memory sticks, etc.), and carrier waves (e.g., transmission via the Internet).

INDUSTRIAL APPLICABILITY

As described above, according to one or more of the above-described embodiments of the present invention, the entire resources are reduced using hash so that limited system resources can be effectively used. Memory fragmentation is suppressed so that available system resources can be increased. Thus, services can be smoothly provided, and the gain of performance can also be obtained.

In particular, expected effects can be increased on a mobile terminal in which a memory compaction function is more simple than in general PC.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for performing a full-text-based logic operation using hash, the method comprising:
   (a) generating a hash data structure having a logic state that varies according to a type of a logic operator, so as to correspond to a first logic operator;
   (b) inserting hash nodes corresponding to first operand data into buckets that are sequentially allocated from the hash data structure;
   (c) if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure and selecting all effective buckets within the hash data structure as resultant values; and
   (d) if the current logic operator is different from the logic state of the hash data structure, changing the logic state of the hash data structure according to the current logic operator,
   wherein the changing comprises: if the logic state of the hash data structure is changed from AND to OR, generating a new hash data structure, inserting buckets corresponding to resultant values of an existing hash data structure into the new hash data structure, releasing all resources of the existing hash data structure and mapping the new hash data structure to the existing hash data structure.

2. The method of claim 1, wherein the hash data structure comprises:
   a hash function generated by a MOD operation in which a hash identifier (ID) is used as an input value;
   a hash table that is a list set of hash nodes that designate starting positions of buckets corresponding to hash keys; and
   a bucket block in which each of buckets includes a hash ID and a pointer for a hash chain.

3. The method of claim 2, wherein buckets of the hash data structure having a logic state of AND further comprise counters for determining resultant values of a logic operation.

4. The method of claim 2, wherein the allocating of the buckets in (b) or (c) comprises sequentially allocating unused buckets among buckets within a predetermined bucket block from the hash data structure, if no unused buckets do not exist in the bucket block, generating a new bucket block and allocating unused buckets within the new bucket block.

5. The method of claim 2, wherein the size of the bucket block is determined as $2^n$ (where, n is an integer number).

6. The method of claim 5, wherein the size of the hash table is determined as a prime number that is a little greater than the size of the bucket block.

7. The method of claim 2, wherein the hash data structure further comprises:
   an AND counter that counts the number of resultant values of the AND logic operation; and
   an OR counter that counts the number of resultant values of the OR logic operation.

8. The method of claim 3, further comprising (e) if the type of the current logic operator is AND, outputting only buckets having the same number of counters as the number of AND logic operators as final resultant values from the hash data structure and if the type of the current logic operator is OR, outputting all effective buckets within the hash data structure as final resultant values.

9. A non-transitory computer-readable recording medium having recorded thereon a hash data structure and a user interface for performing a full-text-based logic operation using hash, wherein the hash data structure comprises:
   a hash function generated by a MOD operation in which a hash identifier (ID) is used as an input value;
   a hash table that is a list set of hash nodes that designate starting positions of buckets corresponding to hash keys; and
   a bucket block in which each of buckets includes a hash ID and a pointer for a hash chain, and
   wherein the user interface comprises:
   a StartUp module generating a hash data structure having a logic state that varies according to a type of a logic operator, so as to correspond to a first logic operator and allocating and initializing memory;
   an Insert module inserting hash nodes corresponding to first operand data into buckets that are sequentially allocated from the hash data structure; and
   a Logic module, if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure,
   wherein the user interface further comprises a ChangeLogic module, if the current logic operator is different from the logic state of the hash data structure, changing the logic state of the hash data structure according to the current logic operator.

10. The non-transitory computer-readable recording medium of claim 9, wherein buckets of the hash data structure having a logic state of AND further comprise counters for determining resultant values of a logic operation, and
   the ChangeLogic module, if the logic state of the hash data structure is changed from AND to OR, generates a new hash data structure, inserts buckets corresponding to resultant values of an existing hash data structure into the new hash data structure, releases all resources of the existing hash data structure and maps the new hash data structure to the existing hash data structure.

11. The non-transitory computer-readable recording medium of claim 9, wherein the hash data structure further comprises:
   an AND counter that counts the number of resultant values of the AND logic operation; and
   an OR counter that counts the number of resultant values of the OR logic operation, and
   wherein the user interface further comprises a Size module outputting a value of the AND counter or the OR counter according to the type of the current logic operator.

12. The non-transitory computer-readable recording medium of claim 9, wherein the user interface, if the type of the current logic operator is AND, outputs only buckets having the same number of counters as the number of AND logic operators as final resultant values from the hash data structure and if the type of the current logic operator is OR, outputs all effective buckets within the hash data structure as final resultant values one by one.

13. A non-transitory computer-readable recording medium having recorded thereon a hash data structure and a user interface for performing a full-text-based logic operation using hash, wherein the hash data structure comprises:
- a hash function generated by a MOD operation in which a hash identifier (ID) is used as an input value;
- a hash table that is a list set of hash nodes that designate starting positions of buckets corresponding to hash keys; and
- a bucket block in which each of buckets includes a hash ID and a pointer for a hash chain, and wherein the user interface comprises:
- a StartUp module generating a hash data structure having a logic state that varies according to a type of a logic operator, so as to correspond to a first logic operator and allocating and initializing memory;
- an Insert module inserting hash nodes corresponding to first operand data into buckets that are sequentially allocated from the hash data structure; and
- a Logic module, if a type of the current logic operator is AND, selecting buckets that coincide with hash nodes corresponding to second operand data among buckets inserted in (b) in the hash data structure or buckets selected as resultant values of the previous operation, as resultant values and if the type of the current logic operator is OR, inserting hash nodes among the hash nodes corresponding to the second operation data that are not retrieved from the hash data structure into the buckets that are sequentially allocated from the hash data structure wherein the user interface, if the type of the current logic operator is AND, outputs only buckets having the same number of counters as the number of AND logic operators as final resultant values from the hash data structure and if the type of the current logic operator is OR, outputs all effective buckets within the hash data structure as final resultant values one by one.

* * * * *